United States Patent
Narita et al.

(10) Patent No.: US 9,594,459 B2
(45) Date of Patent: Mar. 14, 2017

(54) INFORMATION PROCESSING APPARATUS, INFORMATION PROCESSING METHOD AND PROGRAM

(71) Applicant: SONY CORPORATION, Tokyo (JP)

(72) Inventors: Tomoya Narita, Kanagawa (JP); Shunichi Kasahara, Kanagawa (JP); Ritsuko Kano, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/066,270

(22) Filed: Mar. 10, 2016

(65) Prior Publication Data

US 2016/0188117 A1 Jun. 30, 2016

Related U.S. Application Data

(63) Continuation of application No. 13/222,064, filed on Aug. 31, 2011.

(30) Foreign Application Priority Data

Sep. 7, 2010 (JP) .................................. 2010-200150

(51) Int. Cl.
*G06F 3/033* (2013.01)
*G06F 3/041* (2006.01)
(Continued)

(52) U.S. Cl.
CPC .......... *G06F 3/0418* (2013.01); *G06F 3/0488* (2013.01); *G06F 3/04812* (2013.01); *G06F 2203/04101* (2013.01)

(58) Field of Classification Search
None
See application file for complete search history.

(56) References Cited

U.S. PATENT DOCUMENTS

| 5,953,010 A | 9/1999 | Kampe et al. |
| 6,636,244 B1 | 10/2003 | Kelley et al. |

(Continued)

FOREIGN PATENT DOCUMENTS

| JP | 2010-108255 | 5/2010 |
| JP | 2010-157189 | 7/2010 |
| WO | WO2010-084498 A1 | 7/2010 |

OTHER PUBLICATIONS

Rayson, James K. "Aggregate towers: Scale sensitive visualization and decluttering of geospatial data." Information Visualization, 1999. (Info Vis' 99) Proceedings. 1999 IEEE Symposium on. IEEE, 1999.

(Continued)

*Primary Examiner* — Sultana M Zalalee
(74) *Attorney, Agent, or Firm* — Paratus Law Group, PLLC

(57) ABSTRACT

An apparatus and method provide logic for processing information. In one implementation, an apparatus includes a display unit configured to display a first portion of content to a user. The display unit includes a display surface. A detection unit is configured to detect a distance between an interface surface and a reference point disposed along an operational tool of the user. A control unit configured to determine whether the distance falls within a threshold range, and generate a signal to display a second portion of content to the user, when the detected distance falls within the threshold range. The display unit is further configured to display the second content portion, based on the generated signal.

10 Claims, 9 Drawing Sheets

(51) Int. Cl.
    *G06F 3/0488*    (2013.01)
    *G06F 3/0481*    (2013.01)

(56) References Cited

U.S. PATENT DOCUMENTS

| | | | |
|---|---|---|---|
| 6,683,627 B1 * | 1/2004 | Ullmann | G06F 3/038 |
| | | | 715/786 |
| 2005/0134578 A1 | 6/2005 | Chambers et al. | |
| 2005/0259076 A1 | 11/2005 | Hayasaka et al. | |
| 2006/0244735 A1 | 11/2006 | Wilson | |
| 2006/0265653 A1 | 11/2006 | Paasonen et al. | |
| 2007/0214058 A1 | 9/2007 | Rouhi et al. | |
| 2009/0058829 A1 | 3/2009 | Kim et al. | |
| 2009/0122007 A1 | 5/2009 | Tsuzaki et al. | |
| 2009/0251410 A1 | 10/2009 | Mori et al. | |
| 2010/0053109 A1 * | 3/2010 | Narita | G06F 3/042 |
| | | | 345/173 |
| 2010/0138763 A1 | 6/2010 | Kim | |

OTHER PUBLICATIONS

Dec. 17, 2015, Partial European Search Report for related EP Application No. 11179503.5.
Apr. 5, 2016, Extended European Search Report for related EP Application No. 11179503.5.

\* cited by examiner

M1: COORDINATE CORRECTED WITH DATA COLLECTED IN ADVANCE

M0: ACTUALLY DETECTED COORDINATE

INFORMATION PROCESSING APPARATUS, INFORMATION PROCESSING METHOD AND PROGRAM

CROSS-REFERENCE TO RELATED APPLICATIONS

This application is a continuation of U.S. patent application Ser. No. 13/222,064 (filed on Aug. 31, 2011), which claims priority to Japanese Patent Application No. 2010-200150, (filed on Sep. 7, 2010), which are all hereby incorporated by reference in their entirety.

BACKGROUND

The disclosed exemplary embodiments relate to an information processing apparatus, an information processing method, and a program.

In recent years, a touch panel which can detect contact by an operating body has been popularized. Since the touch panel can detect the position thereof contacted by the operating body, the user can perceive the position contacted by the operating body. A touch panel of the type described is disclosed, for example, in Japanese Patent Laid-Open No. 2010-157189.

Also a touch panel which can detect presence of an operating body in the proximity thereof has been popularized. Since a touch panel of this type can detect the position of the operating body in the proximity thereof, the user can grasp the position of the operating body in the proximity of the touch panel.

SUMMARY

However, in the case where a touch panel which can detect contact of an operating body therewith, normally the user can perceive it after the user touches with the touch panel that a coordinate of the touch panel at which it is detected that the touch panel is touched by the user is displaced from a coordinate at which the user wants to actually touch with the touch panel. Therefore, the touch panel is frequently operated in error.

On the other hand, in the case where a touch panel which can detect an operating body positioned in the proximity thereof is used, operations are normally started at a stage at which the presence of the operating body in the proximity of the touch panel is detected. Therefore, also with the touch panel of the type described, that a coordinate of the touch panel at which the presence of the operating body in the proximity of the touch panel is detected is displaced from a coordinate at which the user wants to actually touch with the touch panel is perceived by the user after then.

Thus, it is desirable to provide a novel and improved information processing apparatus which can detect proximity presence of an operating body therewith and can reduce the possibility of an operation in error by the operating body.

Consistent with an exemplary embodiment, an information processing apparatus includes a display unit configured to display a first portion of content to a user, the display unit including a display surface. A detection unit is configured to detect a distance between an interface surface and a reference point disposed along an operational tool of the user. A control unit configured to determine whether the distance falls within a threshold range, and to generate a signal to display a second portion of content to the user, when the detected distance falls within the threshold range. The display unit is further configured to display the second content portion, based on the generated signal.

Consistent with an additional exemplary embodiment, a computer-implemented method for processing information includes displaying a first portion of content to a user on a surface of a display unit. The method includes detecting a distance between an interface surface and a reference point disposed along an operational tool of the user, and determining whether the distance falls within a threshold range. The method includes generating a signal to display a second portion of content to the user, when the detected distance falls within the threshold range.

Consistent with a further exemplary embodiment, a non transitory, computer-readable storage medium stores a program that, when executed by a processor, causes the processor to perform a method for processing information. The method includes displaying a first portion of content to a user on a surface of a display unit. The method includes detecting a distance between an interface surface and a reference point disposed along an operational tool of the user, and determining whether the distance falls within a threshold range. The method includes generating a signal to display a second portion of content to the user, when the detected distance falls within the threshold range.

According to the disclosed exemplary embodiments, with the information processing apparatus, while proximity presence of an operating body can be detected, the possibility of an operation in error of an operating body can be reduced.

The above and other exemplary features and advantages of the disclosed exemplary embodiments will become apparent from the following description and the appended claims, taken in conjunction with the accompanying drawings in which like parts or elements denoted by like reference symbols.

DETAILED DESCRIPTION OF THE PREFERRED EMBODIMENTS

Figure 1A:
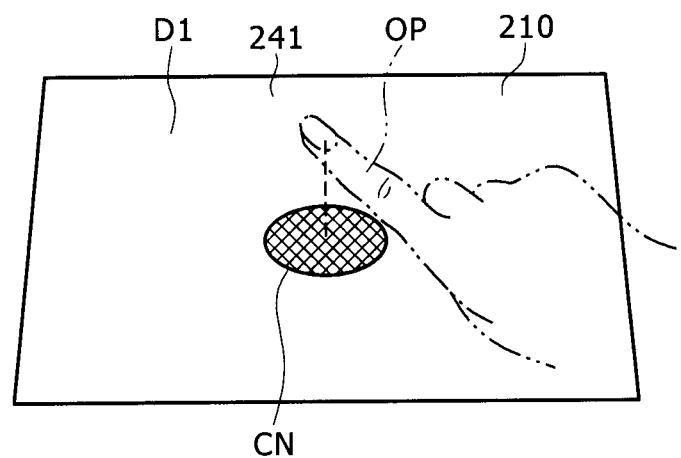
FIGS. 1A and 1B are schematic views illustrating an information processing apparatus according to an exemplary embodiment.

In the following, exemplary embodiments are described in detail with reference to the accompanying drawings. It is to be noted that, in the specification and the accompanying drawings, substantially like parts or elements having substantially like functional configurations are denoted by like reference characters, and overlapping description of the same is omitted herein to avoid redundancy.

It is to be noted that description is given in the following order.

1. Exemplary Embodiments
1-1. Outline of the Information Processing Apparatus
1-2. Functional Configuration of the Information Processing Apparatus
1-3. Hardware Configuration of the Information Processing Apparatus
1-4. Display Example 1 Displayed in the Case Where Proximate Presence of an Operating Body Is Detected
1-5. Display Example 2 Displayed in the Case Where Proximate Presence of an Operating Body Is Detected
1-6. Display Example 3 Displayed in the Case Where Proximate Presence of an Operating Body Is Detected
1-7. Display Example 4 Displayed in the Case Where Proximate Presence of an Operating Body Is Detected
1-8. Display Example 5 Displayed in the Case Where Proximate Presence of an Operating Body Is Detected
1-9. Flow of Processing Executed by the Information Processing Apparatus
2. Modifications
3. Conclusion

1. Exemplary Embodiment

1-1. Outline of the Information Processing Apparatus

Figure 1B:
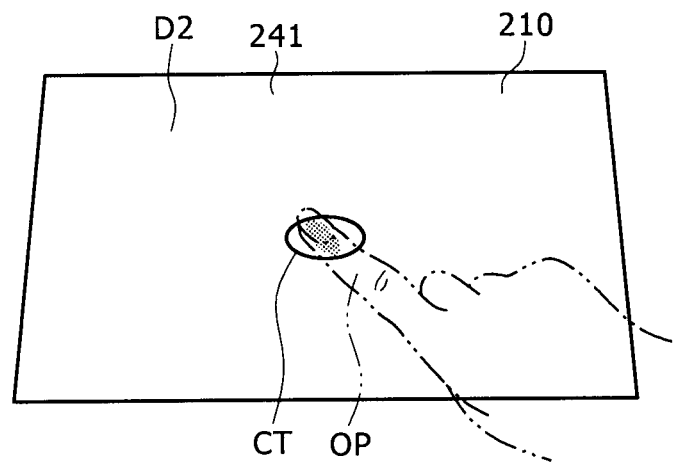

FIGS. 1A and 1B illustrate an outline of an information processing apparatus according to an exemplary embodiment. In the image processing apparatus of the exemplary embodiment, if presence of an operating body OP in the proximity of a non-contacting interface 210 is detected, then the image processing apparatus controls display of a display image on a display face 241 as feedback to the proximity presence of the operating body OP. It is to be noted that such control is effective particularly in the case where a predetermined process is executed by the information processing apparatus according to the exemplary embodiment when presence of the operating body OP in the proximity of the non-contacting interface 210 is detected. This is because, if it is presented to a user that the operating body OP is positioned in the proximity of the information processing apparatus before the predetermined process is executed, then the user can perceive that, if the operating body OP is moved as it is toward the information processing apparatus until it is brought into contact with the information processing apparatus, then the predetermined process will be executed.

In the example illustrated in FIGS. 1A and 1B, if the information processing apparatus of the exemplary embodiment detects presence of an operating body OP in the proximity of the non-contacting interface 210, then a screen image D1 on which a cursor CN is set is displayed. The information processing apparatus manages the position of the operating body OP with respect to the non-contacting interface 210 and the display face 241. Accordingly, the information processing apparatus can detect a position thereof in the proximity of which the operating body OP exists as a proximity coordinate and carry out control so that the cursor CN is displayed at a position of the display face 241 which corresponds to the proximity coordinate. The cursor CN is an object displayed at a position of the display face 241 which corresponds to a position of the non-contacting interface 210 at which the operating body OP is detected, and the shape, size, color and so forth of the object are not restricted specifically.

By the control described, it is possible to improve the operation accuracy of the operating body OP and reduce the possibility of an operation in error by the operating body OP. It is to be noted that, in the example illustrated in FIGS. 1A and 1B, if contact of the operating body OP with the non-contacting interface 210 is detected, then a screen image D2 on which another cursor CT is set is displayed. As seen in FIGS. 1A and 1B, the information processing apparatus can carry out control so that the cursor CN is displayed greater than the cursor CT. At the stage at which the operating body OP is positioned in the proximity of the non-contacting interface 210, the possibility is high that the user may not finally have determined the selection position in comparison with another stage at which the operating body OP contacts with the non-contacting interface 210 and that the selection position may be designated over a wider range by the operating body OP.

Further, if information is not provided to the user before selection is carried out by means of the operating body OP, then the user cannot grasp with which degree the user may select the position on the non-contacting interface 210 and is obliged to touch with a central portion of an item to be selected. However, if it is presented to the user in advance by such control as described above that the operating body OP is positioned in the proximity of the non-contacting interface 210, then the accuracy of contact by the operating body OP is improved and the operation burden on the user can be reduced.

1-2. Functional Configuration of the Information Processing Apparatus

Figure 2:
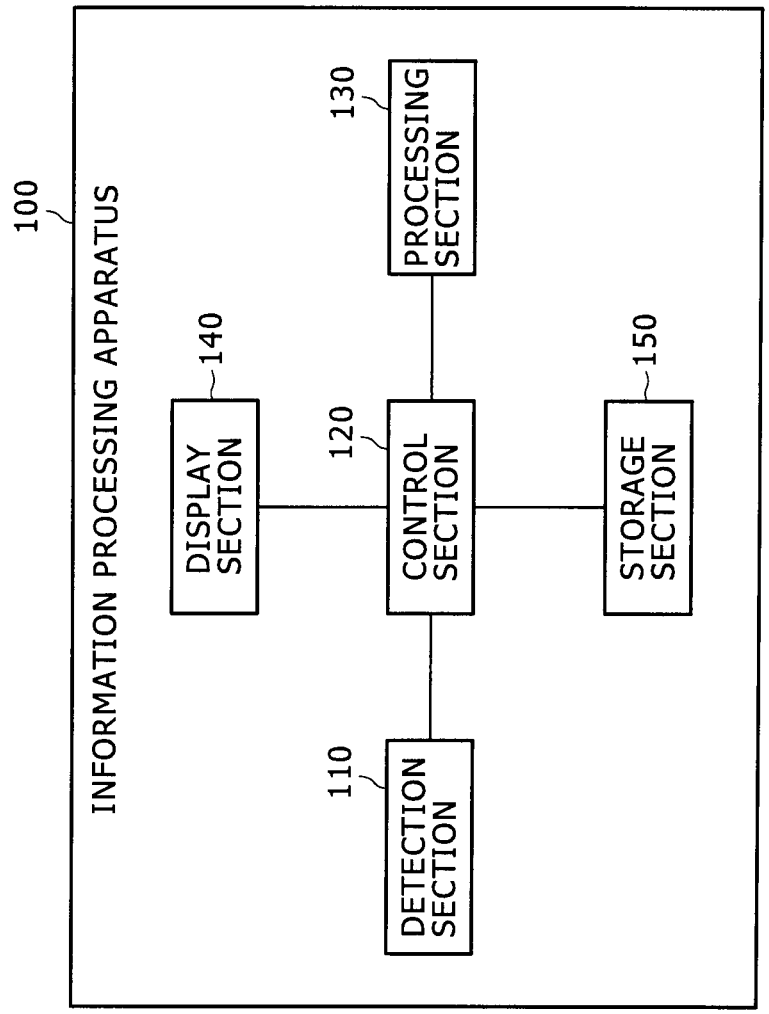
FIG. 2 is a block diagram showing a functional configuration of the information processing apparatus.

FIG. 2 shows a functional configuration of the information processing apparatus according to the exemplary embodiment. Referring to FIG. 2, the information processing apparatus 100 of the exemplary embodiment includes a detection section 110 and a control section 120.

The detection section 110 includes a non-contacting interface 210 (FIG. 3) and has a function of detecting presence of an operating body OP in the proximity thereof. The detection section 110 can detect the position of the non-contacting interface in the proximity of which the operating body OP is positioned as a proximity coordinate.

A proximity operation of the operating body OP may be, for example, an operation of moving the operating body OP in a state in which it is positioned in the proximity of the non-contacting interface (such operation is hereinafter referred to also as "proximity drag operation"). More particularly, the movement of the operating body OP in which a proximity operation is carried out may be any movement only if it can provide information from which it can be grasped that the operating body OP moves in the proximity of the non-contacting interface. The information may be, for example, at least one of the direction in and the distance over which the operating body OP moves in the proximity of the non-contacting interface. That the operating body OP moves in the proximity of the non-contacting interface signifies that the operating body OP moves in a direction parallel to the non-contacting interface while it keeps a state in which it is positioned in the proximity of the non-contacting interface.

The detection section 110 may have a function of detecting contact thereof by the operating body OP. Thereupon, the detection section 110 can detect the position of the non-contacting interface at which the operating body OP contacts as a contact coordinate. A contact operation by the operating body OP may be, for example, an operation for moving the operating body OP with respect to the non-contacting interface while the operating body OP is kept in contact with the non-contacting interface. Such operation is hereinafter referred to also as "touch drag operation." The movement of the operating body OP in the case where a contact drag operation of the operating body OP is carried out may be any movement only if it can provide information that the operating body OP moves with respect to the non-contacting interface while it is kept in contact with the non-contacting interface. The information may be, for example, at least one of the direction in and the distance over which the operating body OP moves while it is kept in contact with the non-contacting interface.

As another contact operation by the operating body OP, an operation for placing the operating body OP into contact with the non-contacting interface is available. Such operation is hereinafter referred to also as "touch operation."

The control section 120 has a function of controlling display on the display face 241 as feedback to presence of the operating body OP in the proximity of the non-contacting interface detected by the detection section 110. For example, in the case where proximity presence of the operating body OP is detected by the detection section 110 as described hereinabove, for example, with reference with FIGS. 1A and 1B, the control section 120 can control the display on the display face 241 by causing the cursor CN on the display face 241 as feedback to the proximity presence.

The control section 120 can carry out control also so that the cursor CN is displayed in response to the position of the display face 241 corresponding to the proximity coordinate detected by the detection section 110. Also it is possible for the control section 120 to carry out control so that the cursor CN is disposed at the position of the display face 241 corresponding to the proximity coordinate and further carry out control so that the cursor CN is disposed at a position displaced by a predetermined amount in a predetermined direction with reference to the position on the display face 241 corresponding to the proximity coordinate.

Further, when contact of the operating body OP is detected by the detection section 110 as described hereinabove, for example, with reference to FIGS. 1A and 1B, the control section 120 can control the display on the display face 241 so that the cursor CT is displayed on the display face 241 in response to the contact.

The control section 120 may decide whether the operating body OP detected by the detection section 110 is in contact with or in the proximity of the non-contacting interface. For example, in the case where it is possible for the detection section 110 to detect a predetermined parameter which varies in response to the distance between the non-contacting interface and the operating body OP, the control section 120 can decide based on the predetermined parameter whether the operating body OP is in contact with or in the proximity of the non-contacting interface.

For example, the control section 120 may decide a relationship in magnitude between the variation amount of the predetermined parameter detected by the detection section 110 with reference to the predetermined parameter in the case where the operating body OP is not in the proximity of the non-contacting interface and a threshold value for proximity detection. For example, if the variation amount of the predetermined parameter exceeds the threshold value for proximity detection, then the control section 120 may decide that the operating body OP detected by the detection section 110 is in the proximity of the non-contacting interface. On the other hand, for example, if the variation amount of the predetermined parameter further exceeds a threshold value for contact detection, then the control section 120 may decide that the operating body OP detected by the detection section 110 is in contact with the non-contacting interface. Accordingly, even in the case where the operating body OP is not strictly in contact with the non-contacting interface, it may be considered that it is decided that the operating body OP is in contact with the non-contacting interface. Therefore, the "contact" is a concept including also a state in which the proximity degree of the operating body OP with respect to the non-contacting interface is high.

The information processing apparatus 100 may further include a processing section 130. The processing section 130 has a function of executing a predetermined process if contact of the operating body OP is detected by the detection section 110. As described hereinabove, the decision by the detection section 110 that the operating body OP contacts with the non-contacting interface is carried out, for example, by the control section 120. Accordingly, when it is decided by the control section 120 that the operating body OP contacts with the non-contacting interface, the processing section 130 can execute the predetermined process. Although the predetermined process is not restricted specifically, it may be, for example, a process of executing a program or a process of reproducing a content. Or, the processing section 130 may execute a process corresponding to a contact coordinate detected by the detection section 110 as the predetermined process.

The information processing apparatus 100 may further includes a display section 140. The display section 140 is configured, for example, from a display device. The display section 140 has the display face 241 and can display data selected by the control section 120 or data determined as a display target. Further, the display section 140 is used to display various kinds of information at a stage at which the predetermined process is executed by the processing section 130.

The display section 140 can carry out display on the display face 241 under the control of the control section 120. In the example described hereinabove with reference to FIGS. 1A and 1B, the display section 140 can display the cursor CN on the display face 241 under the control of the control section 120. Further, the display section 140 can display the cursor CT on the display face 241 under the control of the control section 120.

The information processing apparatus 100 may further includes a storage section 150. The storage section 150 is configured from a storage device such as, for example, a nonvolatile memory. The storage section 150 has a function of storing a program for implementing the control section 120 or the processing section 130 and a function of storing various data and so forth which are used when the program is executed. In the above-described example, a threshold value for proximity detection, a threshold value for contact detection and so forth can be stored.

The control section 120, processing section 130 and so forth are configured from, for example, a CPU (Central Processing Unit), a RAM (Random Access Memory) and so forth. The functions of the control section 120, processing section 130 and so forth are implemented by the CPU developing the program stored in the storage section 150 into the RAM and executing the program. However, the configuration of the control section 120, processing section 130 and so forth is not limited to this, but some of them may be configured from hardware for exclusive use.

1-3. Hardware Configuration of the Information Processing Apparatus

Figure 3:
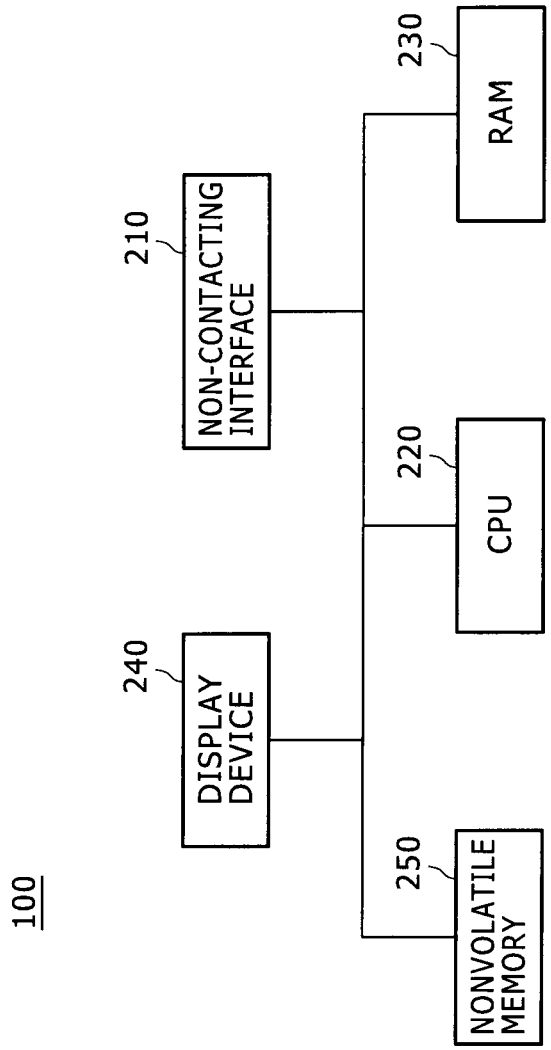
FIG. 3 is a block diagram showing a hardware configuration of the information processing apparatus.

FIG. 3 shows a hardware configuration of the information processing apparatus of the exemplary embodiment. Referring to FIG. 3, the information processing apparatus 100 shown includes a non-contacting interface 210, a CPU 220, a RAM 230, a display device 240, and a nonvolatile memory 250.

The non-contacting interface 210 has a function of detecting a movement of the operating body OP in a non-contacting or contacting condition. By the function, for example, the non-contacting interface 210 can detect various operations by the operating body OP. If the non-contacting interface 210 can detect a predetermined parameter which varies, for example, in response to the distance between the non-contacting interface 210 and the operating body OP, then the detected parameter can be used to decide whether the operating body OP is in contact with or in the proximity of the non-contacting interface 210.

The non-contacting interface 210 may be configured, for example, from an electrostatic touch panel. The electrostatic panel can detect a variation of the capacitance as the predetermined parameter which varies in response to the distance between the non-contacting interface 210 and the operating body OP. Or, the non-contacting interface 210 may be configured, for example, from an optical touch panel. The optical touch panel can detect a variation of the intensity of incident light as the predetermined parameter which varies in response to the distance between the non-contacting interface 210 and the operating body OP.

Further, the non-contacting interface 210 may be configured, for example, from a USB (Universal Serial Bus) camera. In the case where a USB camera is used as the non-contacting interface 210, the predetermined parameter to be used for decision of, for example, whether the operating body OP is in contact with or in the proximity of the non-contacting interface 210 may be detected by a device separate from the non-contacting interface 210.

The CPU 220 functions as an arithmetic processing unit and a control apparatus and controls overall or partial operation in the information processing apparatus 100 in accordance with programs recorded in the nonvolatile memory 250 and/or the RAM 230.

The RAM 230 stores programs to be used by the CPU 220, parameters which vary suitably in execution of the programs and so forth.

The display device 240 is configured from an apparatus which can visually notify the user of information such as, for example, an LCD (Liquid Crystal Display) device or an organic EL (Electroluminescence) display device. The display device 240 outputs, for example, a result obtained by various processes carried out by the information processing apparatus 100. In particular, the display device 240 displays a result obtained by various processes carried out by the information processing apparatus 100 in the form of a text or an image. The display device 240 may be provided in the information processing apparatus 100 or may be provided externally of the information processing apparatus 100.

In FIG. 3, separate devices are shown as performing the functions of display device 240 and non-contacting interface 210. However, this is not required. That is, in some embodiments, these functions may be performed by a single device that senses contact operations and non-contact operations on a panel superimposed with a display panel, as shown in FIGS. 4A to 8B.

The nonvolatile memory 250 is an apparatus for data storage and is configured from a magnetic storage device such as, for example, a hard disk drive (HDD), a semiconductor storage device, an optical storage device, a magneto-optical storage device or the like. The nonvolatile memory 250 stores programs to be executed by the CPU 220 and various data.

An example of the hardware configuration which can implement the functions of the information processing apparatus 100 according to the exemplary embodiment is described above. The components described above may be configured using a member for universal use or may be configured from hardware specified for the functions of the individual components. Accordingly, the hardware configuration to be utilized can be changed suitably in accordance with a current technical level in carrying out the exemplary embodiment.

Figure 4A:
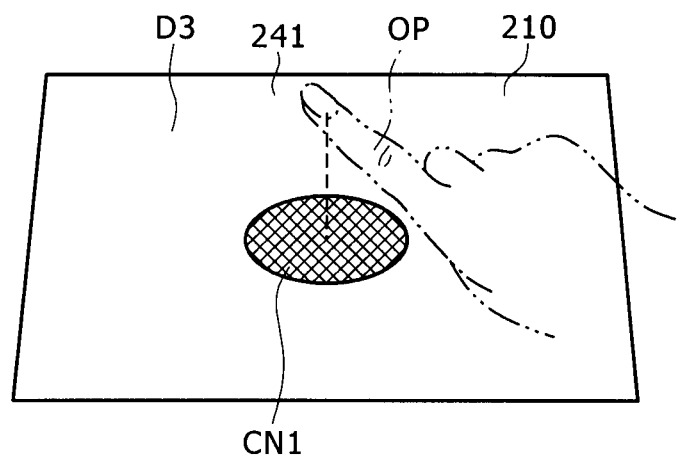
FIGS. 4A and 4B are schematic views showing an example of a display image which is displayed when proximity presence of an operating body is detected by the information processing apparatus.
Figure 4B:
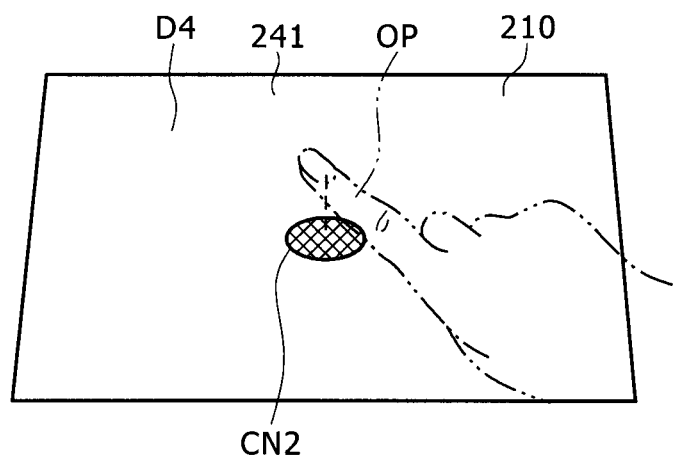

1-4. Exemplary Display in the Case where Proximate Presence of an Operating Body is Detected FIGS. 4A and 4B show a display example which is displayed in the case where proximity presence of an operating body OP is detected by the information processing apparatus of the exemplary embodiment. As described hereinabove with reference to FIGS. 1A and 1B, if presence of the operating body OP in the proximity of the non-contacting interface 210 is detected by the detection section 110, then the control section 120 can carry out control so that the cursor CN is displayed on the display face 241 in response to the proximity presence. The control section 120 can carry out control also so that the size of the cursor CN is changed in response to the distance between the operating body OP and the non-contacting interface 210.

In the example illustrated in FIGS. 4A and 4B, if presence of the operating body OP in the proximity of the non-contacting interface 210 is detected by the detection section 110, then in the case where the degree of proximity is comparatively low, that is, in the case where the distance between the operating body OP and the non-contacting interface 210 is great, the control section 120 causes a screen image D3, to which a comparatively large cursor CN1 is set, to be displayed. On the other hand, in the case where the degree of proximity is comparatively high, that is, in the case where the distance between the operating body OP and the non-contacting interface 210 is small, the control section 120 causes another screen image D4, to which a comparatively small cursor CN2 is set, to be displayed.

In this manner, the control section 120 can carry out control so that, as the proximity degree detected by the detection section 110 increases, the size of the cursor to be displayed on the display face 241 decreases. This is because, as the distance between the operating body OP and the non-contacting interface 210 increases, the possibility that the user may not have finally determined the selection position is higher and the possibility that the selection position may be designated over a wider range by the operating body OP is higher. Further, since the detection accuracy generally decreases as the distance between the operating body OP and the non-contacting interface 210 increases, even if the level of the detection accuracy is taken into consideration, it is considered reasonable to carry out such display control as described above. Further, in the case where the information processing apparatus 100 is comparatively large, the possibility is high that, as the distance between the operating body OP and the non-contacting interface 210 increases, the user may observe the display face 241 from a farther place. Thus, by displaying the cursor large, also an effect that the observability of the cursor is enhanced can be anticipated.

Further, in the case where the configured cursor CN which is formed from a combination of a plurality of parts is displayed while irregular displacement is provided in time to the parts to the proximity position, also it is possible for the control section 120 to reduce the amount of the displacement as the distance between the operating body OP and the non-contacting interface 210 decreases.

For example, in the case where the detection section 110 can detect a predetermined parameter which varies in response to the distance between the non-contacting interface 210 and the operating body OP, the present parameter can be used as the proximity degree.

Figure 5:
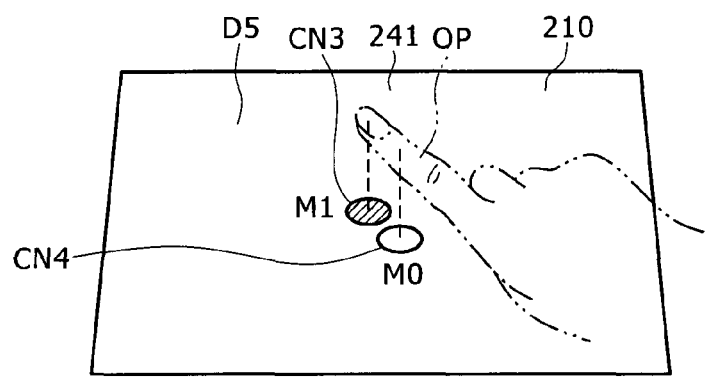
FIG. 5 is a schematic view showing another example of a display image which is displayed when proximity presence of an operating body is detected by the information processing apparatus.

1-5. Exemplary Display in the Case where Proximate Presence of an Operating Body is Detected FIG. 5 shows a display example 2 which is displayed in the case where proximity presence of an operating body OP is detected by the information processing apparatus of the exemplary embodiment. As described hereinabove with reference to FIGS. 1A and 1B, if presence of the operating body OP in the proximity of the non-contacting interface 210 is detected by the detection section 110, then the control section 120 can control such that cursor is displayed on the display face 241 in response to the proximity presence. However, generally some displacement appears between a coordinate to be detected as a position of the operating body OP and an actual proximity position.

Accordingly, also it is possible for the control section 120 to carry out control so that the position of the cursor is corrected. In particular, the control section 120 can apply correction to a proximity coordinate and carry out control so that the cursor is displayed in response to the position on the display face 241 which corresponds to the coordinate after the correction. Since it is possible to estimate the amount of the displacement of the position, the control section 120 may adjust the degree of correction, for example, based on data collected in advance. Further, the control section 120 may decide the direction of a tip end of the operating body OP so as to displace the display position of the cursor by a predetermined direction in the direction of the tip end. Or, the control section 120 may correct the display position of the cursor based on detection data by a sensor which can detect the direction of the tip end.

In the example illustrated in FIG. 5, a cursor CN4 is set to a position on the display face 241 (that being, a first position) which corresponds to the proximity coordinate, and displays a screen image D5 to which a cursor CN3 is set to a second position corrected from the first position on the display face 241 which corresponds to the proximity coordinate.

In this manner, the control section 120 can carry out control so that the position of the cursor is corrected. In the case where a device which can detect proximity presence of the operating body OP is used, since the sensitivity of the device is high, it is sometimes detected in error that also a base end portion rather than a tip end portion of the operating body OP which is a coordinate to be detected as the position of the operating body OP is positioned proximately. Further, proximity detection is frequently carried out by a method different from contact detection, and when the operating body OP changes from a non-contacting state as it is into a contacting state, a phenomenon that the detected coordinate changes by a great amount may possibly occur. Since the information processing apparatus 100 can estimate the direction and the amount of the displacement in advance, it can correct the cursor position to a position with the information taken into account and thereby improve the feeling in use. In the example of FIG. 5, the information processing apparatus 100 corrects the proximity coordinate, which has been displaced in the downward direction, in the upward direction.

Also it is possible to present the cursor of a size greater than a certain size such as a size greater than 1 cm so that most part of the cursor may not be hidden by the operating body OP. Particularly in the case where the display face 241 is small such as a display face smaller than 3 inches, the possibility that the operating body OP itself may hide the cursor itself is high, and therefore, also it is effective to apply further correction to the further position of the cursor so that the cursor may not be hidden by the operating body OP.

Figure 6A:
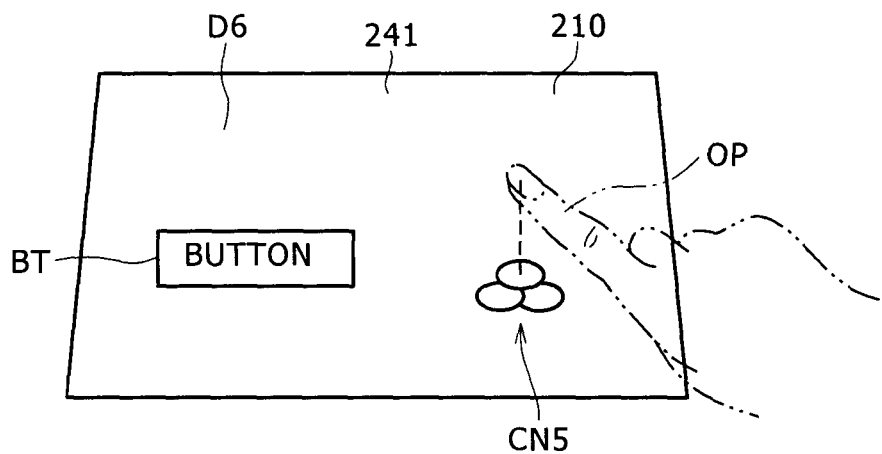
FIGS. 6A and 6B are schematic views showing a further example of a display image which is displayed when proximity presence of an operating body is detected by the information processing apparatus.
Figure 6B:
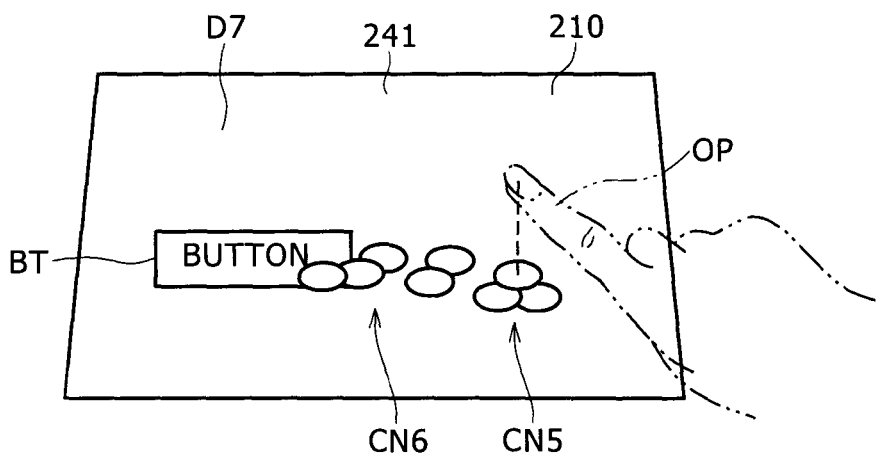

1-6. Exemplary Display in the Case where Proximate Presence of an Operating Body is Detected FIGS. 6A and 6B show a display example 3 which is displayed in the case where proximity presence of an operating body OP is detected by the information processing apparatus of the exemplary embodiment. As described hereinabove with reference to FIGS. 1A and 1B, if presence of the operating body OP in the proximity of the non-contacting interface 210 is detected by the detection section 110, then the control section 120 can control such that a cursor is displayed on the display face 241 as feedback to the proximity presence. However, it is sometimes difficult to grasp which one of items displayed on the display face 241 is selectable and which one of the items is non-selectable.

Accordingly, the control section 120 can specify those items which can be selected by the operating body OP from among items displayed on the display face 241 and carry out control so that predetermined display is carried out between the position on the display face 241 corresponding to the proximity coordinate detected by the detection section 110 and the position of the items which can be selected. By such control, the user can be guided so as to select one of the items which can be selected.

In the example shown in FIGS. 6A and 6B, the control section 120 causes a screen image D6, in which a cursor CN5 is set to a position on the display face 241 which corresponds to the proximity coordinate, to be displayed on the display face 241. Further, after such control is carried out, the control section 120 causes a screen image D7, in which a cursor CN6 is set between the position on the display face 241 which corresponds to the proximity coordinate and the position of a button BT, to be displayed. The button BT is an example of a selectable item, and the cursor CN6 is an example of a predetermined display image. As selectable items, an icon representative of the battery remaining amount, a watch and so forth are displayed.

Further, as seen in FIG. 6B, also it is possible for the control section 120 to carry out control so that the cursor CN6 between the position on the display face 241 which corresponds to the proximity coordinate and the position of a selectable item is displayed such that the cursor CN5 at the position on the display face 241 which corresponds to the proximity position is attracted toward the selectable item. Also it is possible for the control section 120 to specify an item nearest to the proximity coordinate from among those items which are selectable by the operating body OP and carry out control so that a predetermined display image is displayed between the position on the display face 241 which corresponds to the proximity coordinate and the position nearest to the proximate coordinate.

If a part of a cursor configured from a plurality of parts indicates the proximity position of the operating body OP and another part of the cursor is displayed on or in the proximity of an item in the most proximity of the part while the remaining parts are displayed in such a manner as to fill up the interval between them, then the relevance between the operating body OP and the item can be represented. Consequently, it is possible to readily identify selectable items and non-selectable items displayed on the display face 241. Further, the information processing apparatus 100 can provide the user with improvement of the operation feeling or with a relief or the like obtained from the fact that high accuracy of a touching operation is not demanded for the user.

Figure 7A:
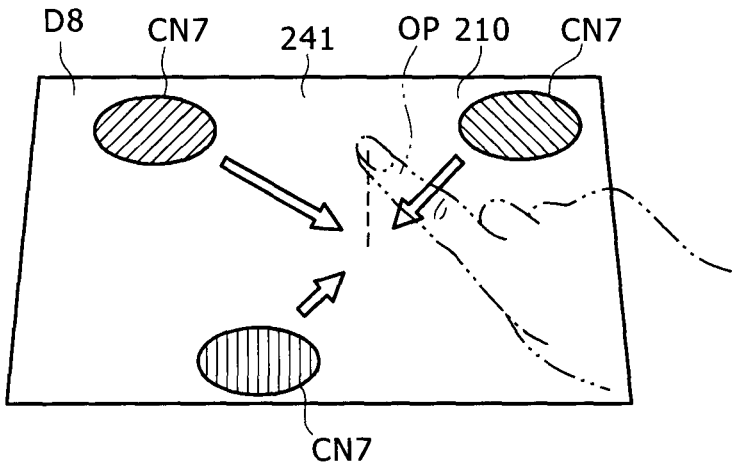
FIGS. 7A to 7C are schematic views showing a still further example of a display image which is displayed when proximity presence of an operating body is detected by the information processing apparatus.
Figure 7B:
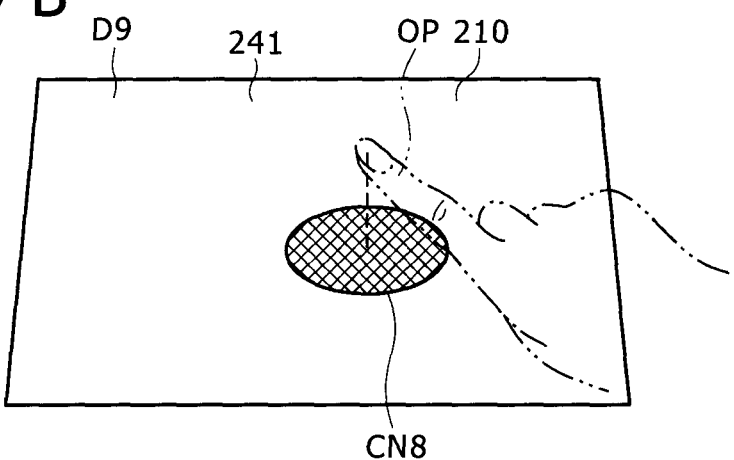
Figure 7C:
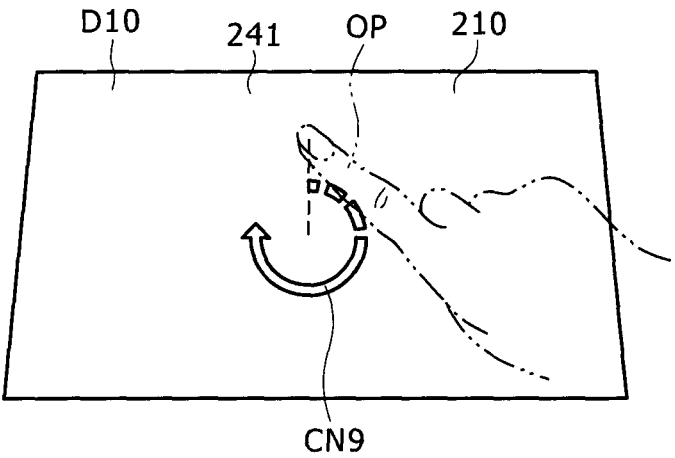

1-7. Display Example 4 Displayed in the Case where Proximate Presence of an Operating Body is Detected FIGS. 7A to 7C show a display example 4 which is displayed in the case where proximity presence of an operating body OP is detected by the information processing apparatus of the exemplary embodiment. As described hereinabove with reference to FIGS. 1A and 1B, if presence of the operating body OP in the proximity of the non-contacting interface 210 is detected by the detection section 110, then the control section 120 can control such that cursor is displayed on the display face 241 as feedback to the proximity presence. Here, processing by the information processing apparatus 100 is sometimes completed while a proximity state of the operating body OP continues for a predetermined period of time.

For example, if the operating body OP is positioned in the proximity of the non-contacting interface 210 in a state in which an image is displayed on the display face 241, then it is supposed that the information processing apparatus 100 may carry out a process to display the image such that part of the image is displayed in an enlarged scale on the display face 241. This is because, in such a process as just described, since time is required to expand part of the image, while the proximity state of the operating body OP continues to be kept, a process of expanding part of the image is advanced and, if the proximity state of the operating body OP is canceled, then the process of expanding part of the image may be interrupted.

Therefore, as an example of control by the control section 120, in the case where the processing section 130 advances processing of an execution target while the operating body OP remains in the proximity state, the control section 120 may carry out control so as to display the cursor on the display face 241 for a period of time after proximity presence of the operating body OP is detected by the detection section 110 until completion of the process executed by the processing section 130 is detected.

In the example shown in FIGS. 7A to 7C, the control section 120 controls so as to display a screen image D8 to which a cursor CN7 is set to a position displaced by a predetermined amount in a predetermined direction from the position on the display face 241 which corresponds to the proximity coordinate. The screen image D8 is displayed when the process is started. Further, the control section 120 controls so as to display a screen image D9 to which a cursor CN8 is set to a position on the display face 241 which corresponds to the proximity coordinate. The screen image D9 is displayed when the process is completed. Further, the control section 120 controls so as to display a screen image D10 in which a cursor CN9 is set to a position on the display face 241 which corresponds to the proximity coordinate. The screen image D10 is displayed, for example, while the processing continues.

In this manner, the information processing apparatus 100 can display a cursor from which the remaining time of the processing can be grasped. The screen image D8 and the screen image D9 illustrate that a plurality of cursors CN7 approach a proximity coordinate as time passes and, upon completion of the processing, the plural cursors CN7 are displayed as a congregated cursor CN8. The screen image D10 illustrates that the cursor CN9 approaches a complete shape thereof as time passes and a complete shape is formed upon completion of the processing. By such screen image is displayed, then the burden on the user by waiting until the processing is completed can be reduced.

The proximity state of the operating body OP is a state which inevitably occurs also at a stage before an operation is carried out. In the case where an operation in the proximity state is permitted, it is difficult for the information processing apparatus 100 to make preparations in advance, and time may be required until the information processing apparatus 100 can react with the operation. In such an instance, it is important to devise an appropriate representation so that the user can wait in a state in which the proximity state is kept.

In such an operation which can be carried out very readily like a proximity operation, appearance of waiting time leads to deterioration of an operation feeling. In addition, from the fact that no reaction is received from the information processing apparatus 100, the user may not notice an entrance of an operation. With such a method as described above with reference to FIGS. 7A to 7C, such a situation as just described can be eliminated.

Figure 8A:
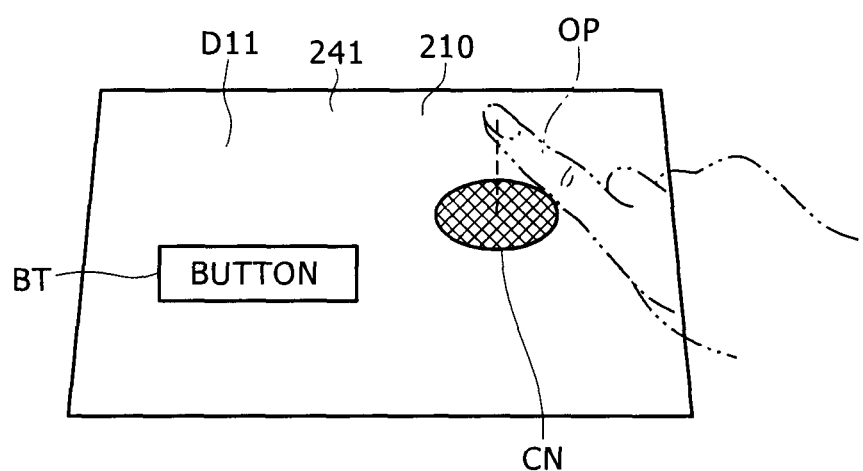
FIGS. 8A and 8B are schematic views showing a yet further example of a display image which is displayed when proximity presence of an operating body is detected by the information processing apparatus.
Figure 8B:
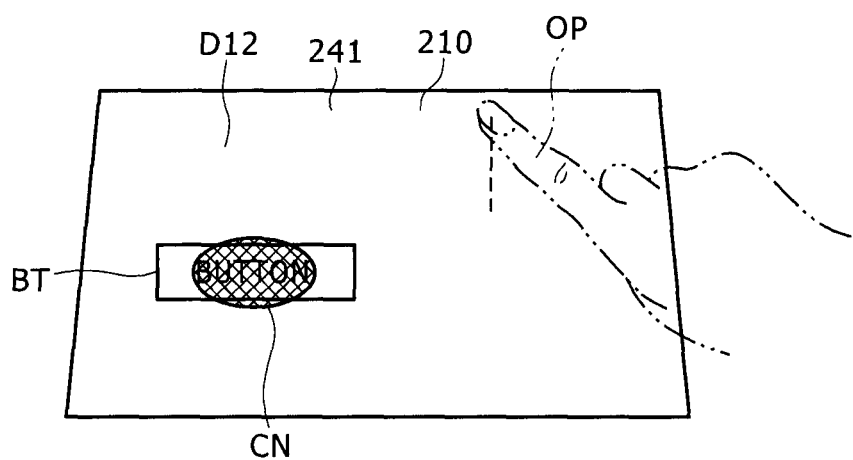

1-8. Display Example 5 Displayed in the Case where Proximate Presence of an Operating Body is Detected FIGS. 8A and 8B show a display example 5 which is displayed in the case where proximity presence of an operating body OP is detected by the information processing apparatus of the exemplary embodiment. As described hereinabove with reference to FIGS. 1A and 1B, if presence of the operating body OP in the proximity of the non-contacting interface 210 is detected by the detection section 110, then the control section 120 can control such that cursor is displayed on the display face 241 as feedback to the proximity presence. However, it is sometimes difficult to grasp which one of items displayed on the display face 241 is selectable and which one of the items is non-selectable.

Further, the burden for moving the operating body OP to a position of a selectable item in order to select the item is sometimes imposed on the user. Further, a selectable item may not be selected accurately because the detection accuracy of a proximity coordinate is excessively low.

Accordingly, the control section 120 can specify a selectable item by the operating body OP from among items displayed on the display face 241 and carry out control so that a predetermined display image is displayed at the position of the selectable item. By such control, such a problem as described above is solved. For example, the control section 120 makes it possible for the user, for example, to readily distinguish selectable item and non-selectable items displayed on the display face 241. Further, the information processing apparatus 100 can provide the user with improvement of the operation feeling or with a relief or the like obtained from the fact that high accuracy of a touching operation is not demanded for the user.

In the example shown in FIGS. 8A and 8B, the control section 120 controls to display a screen image D11 in which a cursor CN is set to a position of the display face 241 which corresponds to the proximity coordinate. Further, after such control is carried out, the control section 120 causes a screen image D12, in which the cursor CN is set to a position of a button BT, to be displayed. The button BT is an example of a selectable item, and the cursor CN is an example of a predetermined display image.

Further, as shown in FIGS. 8A and 8B, also it is possible for the control section 120 to specify an item nearest to a proximity coordinate from among those items selected by the operating body OP, and display a predetermined image at the position of one of the items which is nearest to the proximate coordinate.

1-9. Flow of Processing Executed by the Information Processing Apparatus

Figure 9:
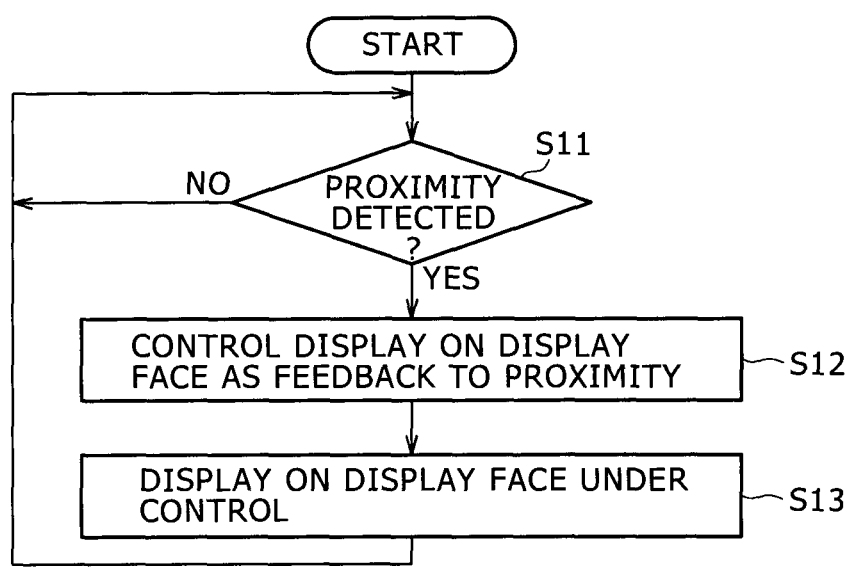
FIG. 9 is a flow chart illustrating an exemplary flow of processing executed by the information processing apparatus.

FIG. 9 illustrates a flow of processing executed by the information processing apparatus of the exemplary embodiment. Referring to FIG. 9, the detection section 110 of the information processing apparatus 100 detects proximity presence of the operating body OP at step S11. The control section 120 controls display on the display face 241 as feedback to the proximity presence detected by the detection section 110 at step S12. The display section 140 carries out display on the display face 241 under the control of the control section 120 at step S13. Thereafter, the processing returns to step S11.

2. Modifications

While exemplary embodiments have been described above with reference to the accompanying drawings, the present disclosure is not limited to the disclosed embodiments. It is apparent that a person skilled in the art could have made various alterations or modifications without departing from the spirit and scope of the disclosure as defined in claims, and it is understood that also such alterations and modifications naturally fall within the technical scope of the present disclosure.

3. Conclusion

According to the disclosed exemplary embodiments, the information processing apparatus which can detect presence of an operating body in the proximity thereof can reduce the possibility of an operation in error of the operating body.

When a device for detecting a non-contacting state is operated, it is difficult for the user to grasp that the operating body OP enters a region in which the device can detect the non-contacting state. However, by using such a method as to display a cursor to present it to the user as feedback to that the system side is reacting, the user can grasp that the operation is carried out correctly, and enhancement of the operation feeling can be anticipated.

Detection of a proximity state is carried out frequently by a different method from that of detection of a contact state, and generally a detected coordinate is displaced from an actual coordinate. If the user cannot recognize the displacement before the operating body OP is actually brought into contact with the information processing apparatus 100, then it is difficult to assure operation accuracy. However, if the information processing apparatus 100 presents an amount of displacement in advance, then the user can correct the displacement based on the presentation unconsciously, and the operation accuracy can be improved. Further, also it becomes easy to adapt the user to an offset generated intentionally by some cause in the inside of the information processing apparatus 100.

Further, the cursor exists not only for the indication of a detected coordinate of the operating body OP but can be represented in various manners. The cursor may possibly be represented in order to indicate that, since the information processing apparatus 100 is under execution of processing, it is in a state in which the user cannot operate the information processing apparatus 100, and also there is the possibility that the cursor may be represented in order to indicate that waiting time until the operation inputted by the user actually works appears. Further, the cursor may possibly be represented in order to indicate a position at which inputting can be carried out, and various states can be represented in various forms. Such a representation can be presented not immediately before an operation is completed but before an operation by touch is carried out in a proximity state. Consequently, before an operation by touch, the user can position the operating body OP in the proximity of the information processing apparatus and make various attempts and can obtain a comprehensible operation feeling.

It should be understood by those skilled in the art that various modifications, combinations, sub-combinations and alterations may occur depending on design requirements and other factors in so far as they are within the scope of the appended claims or the equivalents thereof.

What is claimed is:
1. An information processing apparatus, comprising:
   circuitry configured to
      detect proximity of an operational tool, and
      carry out control in a manner that a display surface displays a cursor as feedback to the proximity detected by the circuitry,
   wherein the circuitry carries out control of the display of the cursor in a manner based on whether an item selectable by the operational tool has been identified among items displayed on the display surface, and display is carried out in a pre-determined way between a position on the display surface which corresponds to a proximity coordinate detected by the circuitry and a position of the identified item,
   wherein the circuitry is further configured to advance a process of an execution target while the operational tool remains in a proximity state, and
   wherein the circuitry carries out control in a manner that the display surface displays the cursor for a period of time after the proximity is detected by the circuitry until completion of the process advanced by the circuitry is detected.

2. The information processing apparatus according to claim 1, wherein:
the circuitry detects degree of proximity of the operational tool; and
the circuitry carries out control in a manner that the display surface displays the cursor to be smaller as the degree of proximity detected by the circuitry is higher.

3. The information processing apparatus according to claim 1, wherein:
the circuitry further detects a position to which the operational tool has gotten close as a proximity coordinate; and
the circuitry carries out control in a manner that the cursor is displayed in response to a position on the display surface which corresponds to the proximity coordinate detected by the circuitry.

4. The information processing apparatus according to claim 3, wherein the circuitry carries out control in a manner that the proximity coordinate detected by the circuitry is corrected and the cursor is displayed in response to a position on the display surface which corresponds to the corrected coordinate.

5. The information processing apparatus according to claim 1, wherein the circuitry carries out control in a manner based on whether an item selectable by the operational tool has been identified among items displayed on the display surface, and display is carried out in a pre-determined way at a position of the identified item.

6. The information processing apparatus according to claim 5, wherein the circuitry carries out control in a manner based on whether an item nearest to the proximity coordinate has been identified among items selectable by the operational tool, and display is carried out in a pre-determined way at a position on the display surface which corresponds to the proximity coordinate.

7. The information processing apparatus according to claim 1, wherein:
the circuitry detects contact of the operational tool; and
the circuitry is further configured to execute a pre-determined process when the circuitry detects the contact.

8. The information processing apparatus according to claim 7, wherein:
the circuitry detects a position contacted by the operational tool as a contact coordinate; and
the circuitry executes a process corresponding to the contact coordinate detected by the circuitry as the pre-determined process.

9. An information processing method, comprising:
detecting proximity of an operational tool; and
carrying out control in a manner that a display surface displays a cursor as feedback to the proximity,
wherein control of the display of the cursor is carried out in a manner based on whether an item selectable by the operational tool has been identified among items displayed on the display surface, and display is carried out in a pre-determined way between a position on the display surface which corresponds to a detected proximity coordinate and a position of the identified item,
wherein a process of an execution target is advanced while the operational tool remains in a proximity state, and
wherein the control is carried out in a manner that the display surface displays the cursor for a period of time after the proximity is detected until detection of completion of the process which is advanced.

10. A non-transitory computer-readable medium having embodied thereon a program, which when executed by a computer causes the computer to execute a method, the method comprising:
detecting proximity of an operational tool, and
carrying out control in a manner that a display surface displays a cursor as feedback to the proximity,
wherein control of the display of the cursor is carried out in a manner based on whether an item selectable by the operational tool has been identified among items displayed on the display surface, and display is carried out in a pre-determined way between a position on the display surface which corresponds to a proximity coordinate and a position of the identified item,
wherein a process of an execution target is advanced while the operational tool remains in a proximity state, and
wherein the control is carried out in a manner that the display surface displays the cursor for a period of time after the proximity is detected until detection of completion of the process which is advanced.

* * * * *